United States Patent
Ladirat et al.

(10) Patent No.: US 6,620,372 B1
(45) Date of Patent: Sep. 16, 2003

(54) METHOD AND DEVICE FOR DRAWING A MOLTEN MATERIAL CONTAINED IN A CRUCIBLE

(75) Inventors: Christian Ladirat, St Laurent des Arbes (FR); Jean-Louis Maurin, Barnols-sur-Ceze (FR); Jacques Lacombe, Pujaut (FR)

(73) Assignees: Commissariat a l'Energie Atomique, Paris (FR); Compagnie General des Matieres Nucleaires, Velizy-Villacoublay (FR)

(*) Notice: Subject to any disclaimer, the term of this patent is extended or adjusted under 35 U.S.C. 154(b) by 0 days.

(21) Appl. No.: 09/869,370
(22) PCT Filed: Oct. 27, 2000
(86) PCT No.: PCT/FR00/03008
  § 371 (c)(1),
  (2), (4) Date: Jun. 27, 2001
(87) PCT Pub. No.: WO01/30709
  PCT Pub. Date: May 3, 2001

(30) Foreign Application Priority Data

Oct. 28, 1999 (FR) .................................. 99 13500

(51) Int. Cl.[7] .................................................. C21C 5/46
(52) U.S. Cl. ........................ 266/45; 222/600; 65/327; 65/347
(58) Field of Search ................... 266/45, 236; 65/327, 65/347; 222/592, 600

(56) References Cited

U.S. PATENT DOCUMENTS 5,567,218 A  10/1996  Ladirat et al.
5,643,350 A  * 7/1997  Mason et al. .................. 65/327

FOREIGN PATENT DOCUMENTS

FR    2 704 634    11/1994

* cited by examiner

*Primary Examiner*—Scott Kastler
(74) *Attorney, Agent, or Firm*—Pearne & Gordon LLP

(57) ABSTRACT

A drawing-off device (18) is used to empty a molten material (28) such as glass contained in a cooled crucible (10), in which there is an elongated pour orifice (30), a cooled slide valve (32) and a bar (36) forming a thermal bridge between the molten material (28) and the bottom (24) of the crucible (10), along one end (30a) of the orifice (30).

14 Claims, 3 Drawing Sheets

METHOD AND DEVICE FOR DRAWING A MOLTEN MATERIAL CONTAINED IN A CRUCIBLE

TECHNICAL FIELD

The invention is related to a drawing-off process or a molten material such as glass contained in a crucible, the walls and bottom of which are at least partly cooled.

The invention also relates to a drawing-off device making use of this process.

The invention is applicable to drawing off all molten materials contained in a crucible, for which the walls and the bottom are at least partially cooled. One specific application is the vitrification of very high activity nuclear waste.

STATE OF THE ART

It is well known that a material such as glass can be melted by adding this material into a crucible in the solid state and then melting it in a crucible, for example by induction.

It is also known how to at least partially cool the walls and the bottom of this crucible, in order to increase the life of the crucible by keeping it at a relatively low temperature. In particular, this cooling can be achieved by water circulation. Its effect is to form a layer of stratified solid glass at the contact with the cooled walls and the bottom of the crucible, isolating the bottom and the walls from the molten material. It is thus possible to produce molten materials such as glass at high temperatures (more than 1150° C.) without replacing the crucible too frequently.

When this known technique is used for vitrification of very high activity nuclear waste, the waste is added into the melting glass contained in the crucible. The weight of glass containing the waste is then emptied into a container located under the crucible, through a drawing off device provided for this purpose in the bottom of the crucible.

The life of the crucibles is increased by cooling the walls and the bottom of the crucibles, and this increase is particularly advantageous in this application. Used crucibles form radioactive waste that must be conditioned and stored.

Furthermore, when crucibles with cooled walls and bottoms are used for the vitrification of nuclear waste, they form waste with a lower degree of activity than uncooled crucibles. Melting glass contracts on contact with the cold walls, such that the solidified glass does not adhere to the walls. Consequently, the crucible may be perfectly cleaned at the end of the life, unlike an uncooled crucible in which there are always encrusted highly radioactive solid glass particles, even after cleaning.

Different emptying techniques are known for drawing off the molten material contained in a crucible.

According to a first technique, a pour nozzle is used that passes vertically through the bottom of the crucible and extends over a certain length below the crucible. The nozzle is cooled to form a glass plug inside the nozzle that normally prevents the crucible from being emptied. When it is desired to draw the liquid off, the nozzle is heated using an auxiliary heating system; for example induction.

There are several disadvantages of this emptying technique:

the pour nozzles are consumable wear parts with a short life;
when the nozzle is heated for drawing off purposes, the plug drops as a single piece and causes splashes of liquid glass, which is not a good thing when the glass contains highly radioactive waste;
the pour nozzle is only cooled very slowly, such that it is impossible to control the drawing off flux and to stop pours very sharply.

Another emptying technique in particular is described in document FR-A-2 704 634.

In this case, the drawing off device comprises a circular pour orifice passing through the cooled bottom of the crucible, a cooled slide valve capable of closing and opening this orifice in a controlled manner, and a metal sleeve (also circular) inserted in the pour orifice. The temperature of the metallic sleeve in this device, usually made of molybdenum, is different from the temperature of the bottom of the crucible and it projects upwards inside the crucible, so as to pass through the solidified glass layer contained in the bottom of the crucible to penetrate into the molten glass.

When the valve slide is closed, a solid glass plug is formed in the metallic sleeve, in contact with the cooled upper surface of the said slide. Therefore, the valve is isolated from the melting glass, such that its life is approximately the same as the life of the crucible and that it can be cleaned equally efficiently.

The valve slide is opened when it is desired to draw off. Since the metallic sleeve and the solid glass plug formed in the sleeve are no longer in contact with the cooled slide, the viscosity of the hot glass in contact with the sleeve reduces to eliminate the solid glass which drops out by gravity. The position of the valve slide is then a means of adjusting the liquid glass flux by more or less closing the pour orifice.

This pour device also has some disadvantages.

A first disadvantage relates to oxidation of the pour sleeve. It is found that the sleeve faces in contact with air at the end of emptying are oxidized. This reduces the life of the sleeve, which is contrary to the required purpose using a cooled crucible, which is precisely to guarantee an increase in the life of the crucible.

Another disadvantage of the drawing off device described in document FR-A-2 704 634 consists of permanent retention of the glass at the end of emptying. Since the sleeve projects upwards over a certain distance from the bottom of the crucible, emptying is not complete. This can cause problems, particularly if the molten material contained in the crucible is glass with a high content of platinoids. If these elements are not put back into suspension, they will settle to the bottom of the crucible. Eventually, this can cause electrical malfunctions such as the occurrence of electrical arcs that can cause local melting of the upper wall of the double wall structure forming the bottom of the crucible. This melting can lead to penetration of the said upper wall, which causes leaks of the cooling water in the crucible.

In this case, the only solution is to eliminate the sleeve placed in the pour orifice. However, there is then a risk that drawing off will be impossible. Thus, when the molten material is a fairly bad conductor of heat and has a particularly high melting point, as is the case particularly for glass with a high content of platinoids, the glass hardly ever starts pouring when the valve is opened. The glass plug is then deformed under the effect of heating and the glass content in the crucible, before moving into an equilibrium position that prevents the valve slide from being closed.

PRESENTATION OF THE INVENTION

The purpose of the invention is precisely to describe a process and a device for drawing off a molten material such as glass contained in a crucible, designed not to have the disadvantages of known drawing off techniques, and particularly so that pour starting and stopping times and the flux rate can be precisely controlled using parts with a life comparable to the life of a cold crucible, while providing good reproducibility of the pour process, avoiding glass splashes and providing good control and good stability of the melting glass jet, regardless of the nature of the jet, without any risk of glass retention at the end of emptying.

According to the invention, this result is achieved using a drawing off process of a molten material contained in a crucible with an at least partly cooled bottom, to form a solidified layer of material at the contact with the said bottom, process according to which drawing off is achieved by opening a valve, also cooled, initially closing off a pour orifice formed in the bottom of the crucible, characterised in that the shape of the pour orifice as seen from above is elongated, and that drawing off is started at a first end of the said orifice forming a thermal bridge between a part of the bottom delimiting the said first end and the molten material contained in the crucible above the said solidified layer.

Thus, by replacing the usually circular shape of the pour orifice by an elongated shape and forming a thermal bridge between one of the ends of this orifice and the molten material, there is no doubt that it will be possible to start the pouring of the material, regardless of its nature, without any risk of this material being retained at the end of emptying.

Furthermore, due to the fact that the thermal bridge is made entirely within the crucible, it is never in contact with air such that risks of oxidation are reduced. Therefore its life is the same as the life of the entire crucible.

Furthermore, the layout of the thermal bridge at one end of an elongated pour orifice is sufficient to control tripping of the pour in a perfectly controlled and reproducible manner. In particular, the plug formed by the material is gradually melted starting from this end, such that there is no risk of projection due to the solid plug dropping, unlike the situation with all existing techniques.

Advantageously, the thermal bridge is formed by placing a bar made of a thermally conducting material in the crucible in contact with the bottom part of the crucible along the first end of the pour orifice. However, the temperature of the poured glass is limited to the melting temperature of the metal making up the thermal bridge.

In one preferred embodiment of the invention, a valve is used comprising a cooled slide that slides under the pour orifice along a longitudinal axis of this orifice.

Preferably, the drawing off position is on the longitudinal axis of the pour orifice, making the shape of the first end of the pour orifice convex and the end near the cooled slide concave, centred on the longitudinal axis of the pour orifice. Thus, the first end of the pour orifice is advantageously approximately in the shape of a V.

In the preferred embodiment of the invention, a crucible is also used with a relatively thin bottom around the pour orifice. This characteristic facilitates melting of the plug formed in the pour orifice after the valve has opened.

For the same reason, the bottom of the crucible advantageously does not have any cooling means in the immediate vicinity of the pour orifice.

Another purpose of the invention is a device for drawing off a molten material contained in a crucible comprising a bottom and means of at least partly cooling this crucible to form a solidified layer of the material in contact with the bottom, device comprising a valve, means of cooling this valve, and a pour orifice formed in the bottom of the crucible and normally closed by the valve, characterised in that the shape of the pour orifice as seen from above is elongated and in that the means forming the thermal bridge are inserted between the part of the bottom delimiting a first end of the pour orifice and the molten material contained in the crucible, above the said stratified layer.

BRIEF DESCRIPTION OF THE DRAWINGS

We will now describe a preferred non-limitative embodiment of the invention with reference to the attached drawings, in which.

DETAILED DESCRIPTION OF A PREFERRED EMBODIMENT OF THE INVENTION

Figure 1:
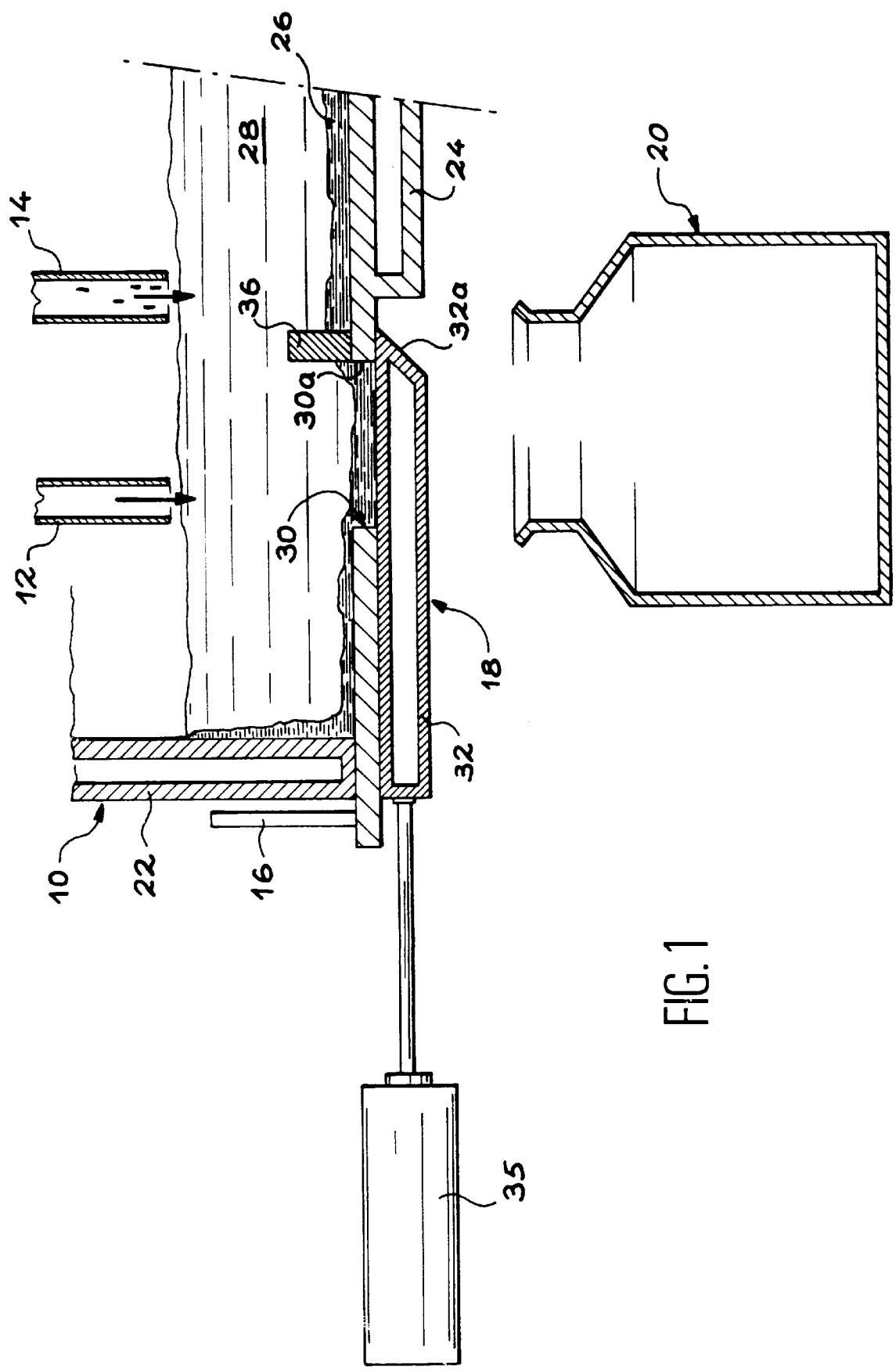
FIG. 1 is a diagrammatic sectional view showing a part of a cold crucible melting installation comprising a drawing off device according to the invention.

As shown very diagrammatically in FIG. 1, a cold crucible melting installation used for vitrification of very high activity nuclear waste comprises a continuously cooled crucible 10, pipes 12 and 14 used to add glass and waste respectively into the crucible 10, heating means such as an induction coil 16 surrounding the crucible 10, a drawing off device 18 and a container 20 formed under the crucible to contain melting glass during operation of the drawing off device.

The crucible 10 comprises a peripheral wall 22, for example cylindrical, and a flat bottom 24 also called the "sole". The wall 22 and the bottom 24 of the crucible 10 are at least partially fitted with independent cooling devices. In the embodiment shown, these cooling means consist of water circulation at regulated temperature, for example about 20° C., inside he walls 10 and the bottom 24. These walls and bottom are provided with a double wall structure as shown in FIG. 1.

When glass is added into the crucible 10 in solid form through pipe 12, it is melted by heating means, in this case formed of induction coil 16. At the same time, continuous use of cooling means of the walls 22 and the bottom 24 of the crucible creates a layer of solidified glass 26 in contact with the walls and the bottom. Therefore, the melting glass 28 contained in the crucible 10 is separated from the walls 22 and the bottom 24 by the layer of solidified glass 26.

The very high activity nuclear waste that is to be conditioned is added into the melting glass 28 at this stage through pipe 14.

The drawing off device 18 is activated when it is desired to empty the melting glass 28 containing waste into the container 20 placed below the crucible 10.

According to the invention, this drawing off device 18 comprises a pour orifice 30 passing through the bottom 24 of the crucible 10, a slide valve 32 normally closing off this orifice and a means forming a thermal bridge; the manufacture, layout and function of this thermal bridge will be described in more detail later.

The pour orifice 30 has an elongated shape and is relatively large in the plane formed by the bottom 24 of the crucible 10, i.e. as seen from above. In the embodiment shown more precisely in FIG. 2, the pour orifice 30 is approximately in the shape of a rectangle, the first end 30a of which is convex and approximately V-shaped and has a rounded tip. More precisely, this first end 30a of the pour orifice 30 is centred on the longitudinal axis 34 of this orifice, in other words is symmetric about this axis. All other sides of the orifice 30 are straight. For example, the dimensions of the pour orifice 30 are 100 mm×60 mm.

In practice, the pour orifice 30 is advantageously formed in a location relatively close to the wall 22 of the crucible 10 to facilitate the installation of guide and control means for the slide 32 of the valve on the outside of this wall 22. This protects the guide and control means from heat dissipated by the melting glass. Risks of malfunction such as blockage of the slide 32, for example due to expansion of the guides or to poor operation of the control means, are thus reduced.

The longitudinal axis 34 of the pour orifice 30 is advantageously in the radial direction with respect to the wall 22 of crucible 10. The first end 30a of the pour orifice 30 then faces the centre of the crucible, whereas the opposite end of the orifice 30 is facing the wall 22.

Furthermore, the means of cooling the bottom 24 of the crucible 10, in this case materialised by double wall structure, do not extend as far as the edges of the pour orifice 30. Thus, the central part of this orifice remains relatively remote from the cooling means. This means that the different elements of the drawing off device can be kept at a sufficiently low temperature to prevent any malfunction while preventing excessive cooling of the solid glass plug that forms in the pour orifice 30 when the valve is closed. Thus, when this valve is opened, most of the heat flux output from the melting glass 28 is transmitted to the plug and not to, the cooling water that circulates in the bottom 24 of the crucible. This facilitates heating of the plug necessary to start the pour. However, the temperature of the poured glass is limited to the melting temperature of the metal forming the thermal bridge.

Furthermore, and as shown particularly in FIG. 1, the pour orifice 30 is formed in the relatively thin part of the bottom 24 of the crucible 10. In the embodiment shown in which the bottom 24 is cooled by making the bottom from a double wall structure enabling water circulation, the pour orifice 30 is formed in a part of the bottom 24 with a single wall structure aligned with the top wall of this double wall structure. For example, the thickness of this single wall is about 5 mm.

Note that in practice, the part of the bottom 24 comprising the pour orifice 30 may be formed in the body of the valve used to close off this orifice. The body of the valve then forms an integral part of the bottom of the crucible and comprises cooling means that include the characteristics described above.

Like the walls 22 and the bottom 24 of the crucible 10, the slide 32 of the valve is provided with independent cooling means. When the valve is closed, these cooling means cool the part of the bottom 24 of the crucible in which the pour orifice 30 is formed. In particular, they make a contribution to the formation of a glass plug solidified in this orifice. In the embodiment shown, the cooling means of the slide 32 are water circulation cooling means inside this slide, which is provided with a double wall structure for this purpose.

The slide 32 is placed under the bottom 24 of the crucible, and more precisely under the part of this bottom in which the pour orifice 30 is formed, in order to be able to close off and more or less open this orifice during its displacement. The slide 32 is slightly larger than the orifice 30, so that it can be completely closed when the valve is closed.

The slide 32 is capable of moving in translation under the bottom 24 of the crucible, under the action of an electric jack 35 combined with guide means (not shown). The layout of the pour orifice 30 close to the wall 22 is a means of placing the jack 35 and the guide means outside the crucible 10, as was mentioned previously. The displacement axis of the valve slide 32 is coincident with the axis 34 of the pour orifice 30.

The slide 32 has a front end, or a leading end 32a that moves towards the first end 30a of the pour orifice 30 when the valve is actuated in the closing direction. When the valve is closed, the leading end 32a is located slightly beyond the first end 30a of the pour orifice, such that it is completely closed.

Figure 2:
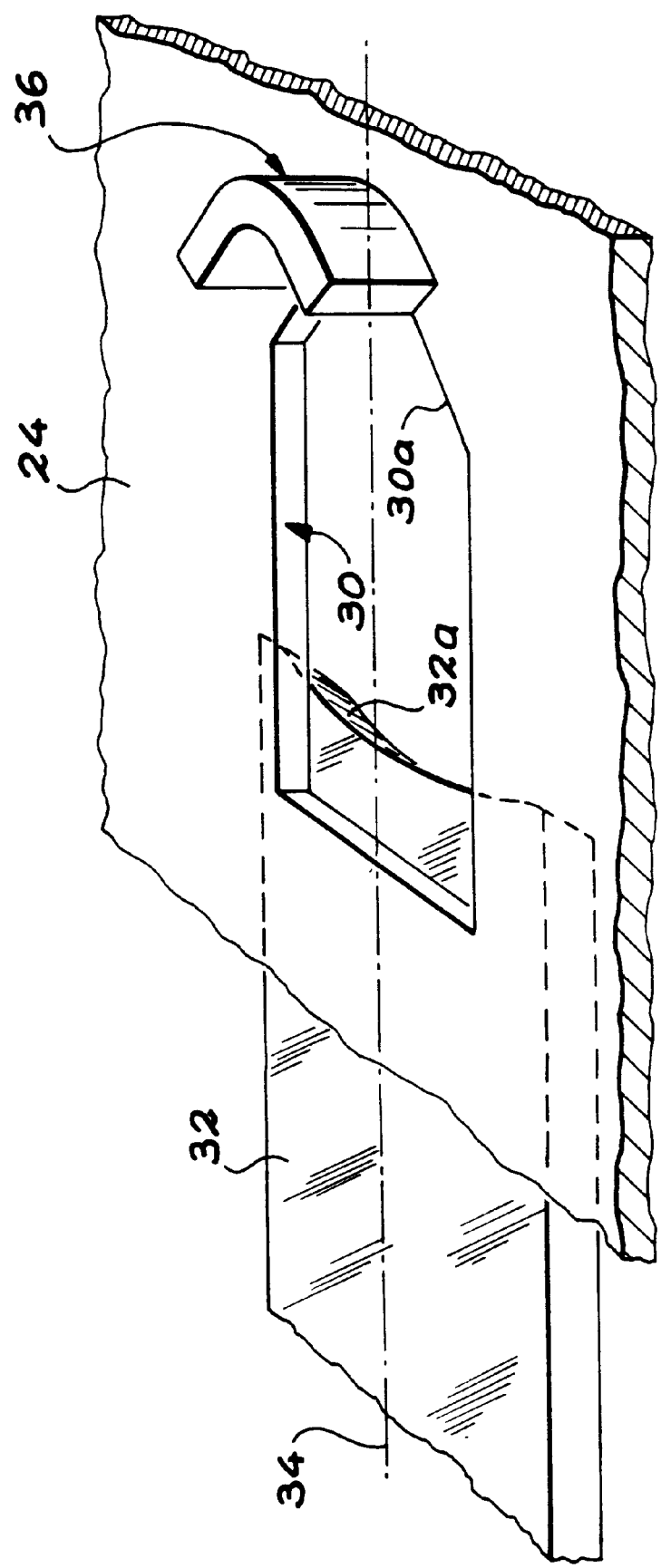
FIG. 2 is a perspective view showing the drawing off device of the installation illustrated in FIG. 1 in more details and FIGS. 3A, 3B, 3C and 3D are diagrammatic sectional views comparable to FIG. 1, illustrating four successive steps in the drawing off process according to the invention.

As shown in FIGS. 1 and 2, the leading end 32a of the slide 32 of the valve is bevelled downwards, so that there is always an acute angle in the part flush with the bottom 24 of the crucible 10. Furthermore, as seen from above, the shape of the leading end 32a of the slide 32 is concave and approximately in the shape of an arc of a circle, in the direction of the width of the pour orifice 30. This concave shape is centred on the longitudinal axis 34 of the pour orifice 30, i.e. is located symmetric with respect to this axis.

The convex and concave forms of the ends 30a and 32a facing each other form a diaphragm centred on the longitudinal axis 34 that opens up gradually when the slide 32 is activated in the opening direction. As will be understood better later, this layout is a means of controlling the start position of melting the plug that initially closes off the pour orifice 30 on the side of its end 30a. It also enables melting to continue along its longitudinal axis 34 towards the opposite end of the pour orifice. The result is controlled and reproducible melting of the plug without any risk of an unmolten plug dropping in the container 20.

As shown in FIGS. 1 and 2, the drawing off device 18 also comprises a means forming a thermal bridge materialised by a bar 36 in the embodiment shown. This bar 36, for example made of stainless steel, is held in contact with the bottom 24 of the crucible 10 in the part immediately adjacent to the first end 30a of the pour orifice 30. More precisely, the bar 36 may for example be welded to the top face of the bottom 24, in the thin part formed by a single wall, along the edge of orifice 30 forming the tip of the end 30a of this orifice. The top view of the bar 36 thus forms a rounded V symmetrically about the longitudinal axis 34 of the pour orifice 30. Furthermore, the bar 36 projects upwards inside the crucible 10 over a sufficient height so that its upper part is in contact with the melting glass 28. For example, this height is about 30 mm. The bar 36 thus forms a thermal bridge between the melting glass 28 and the bottom 24 of the crucible 10, passing through the solidified glass layer 26 that covers the bottom. For example, the thickness of the bar 36 starting from the edge of orifice 30 may be about 3 mm.

The thermal bridge formed by the bar 36 in combination with the elongated shape of the pour orifice 30 contributes to initiating drawing off at the end 30a of the pour orifice 30, when the slide 32 is open.

The method of using the drawing off device 18 conform with the invention will now be described with reference to FIGS. 3A to 3D in sequence.

Initially (FIG. 3A), slide 32 is in its most forward position. It then completely closes off the pour orifice 30. A solidified glass layer 26 covers the bottom of the crucible under the cooling effect of the bottom 24 of the crucible and the slide 32 of the valve, forming a plug that fills the pour orifice 30.

When the valve opening control is given, the slide 32 retracts under the action of the jack 35 (FIG. 1). Its leading end 32a is then 70 mm from the first end 30a of the pour orifice 30.

Figure 3A:
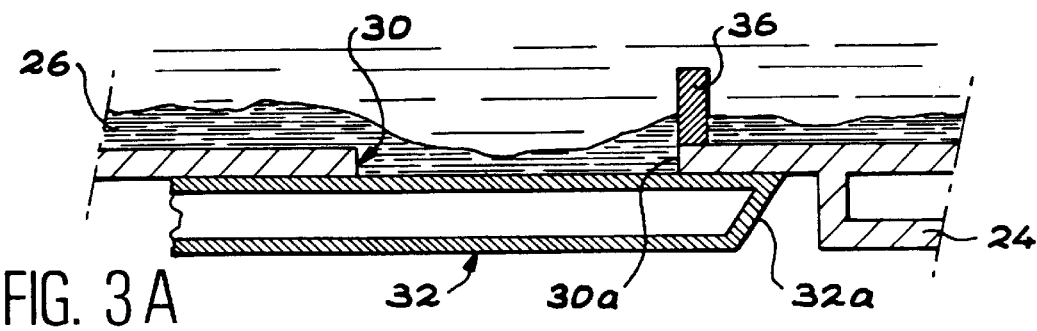
Figure 3B:
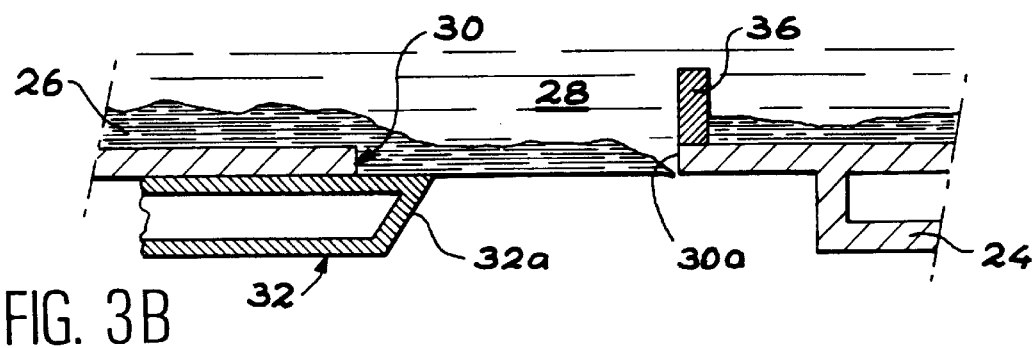

The pour starts three or four minutes later. More precisely, because the solidified glass plug that closes off the pour orifice 30 is no longer cooled by the valve slide 32, and under the effect of the thermal bridge formed by the bar 36, this plug starts to melt at the first end 30a of the orifice 30 along its longitudinal axis 34. This transient state is illustrated in FIG. 3B.

Figure 3C:
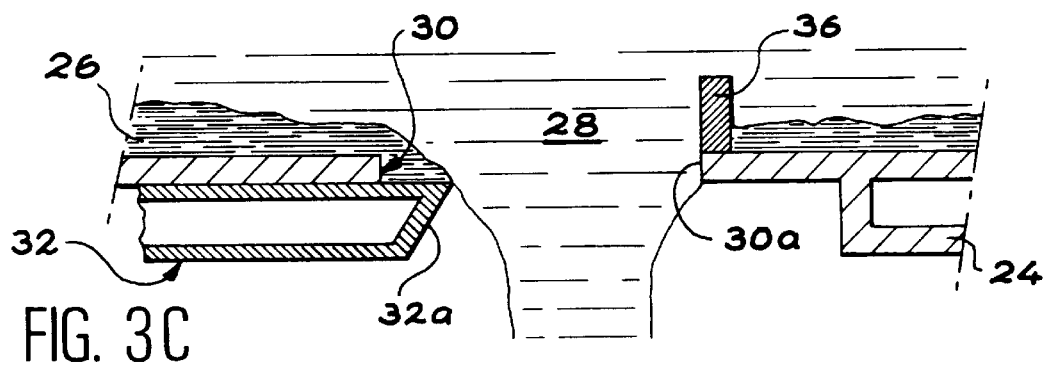
Figure 3D:
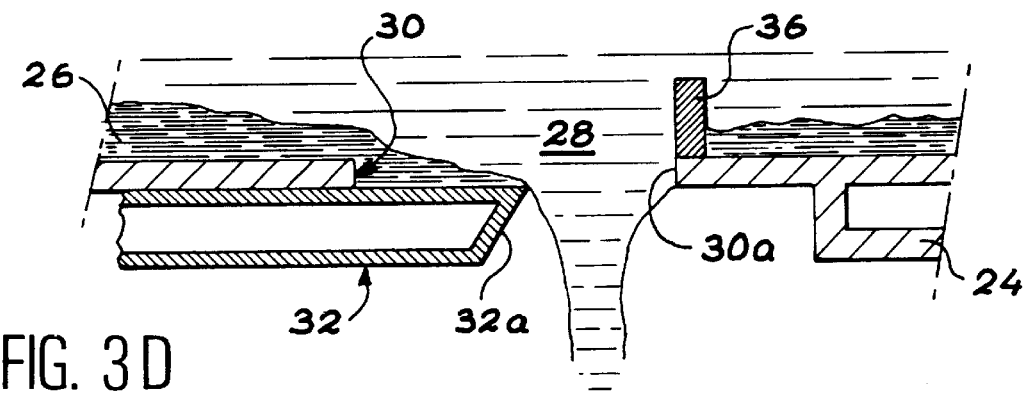

As soon as it has started, melting of the glass plug propagates very quickly and almost instantaneously along the longitudinal axis 34 of the pour orifice 30 as far as the leading end 32a of the valve slide 32, as shown in FIG. 3C. The result is then a maximum pour rate of the melting glass, without any solid glass falling into the container 20 located under the orifice 30.

The beginning of the glass pour is then immediately controlled by partial closing of the slide 32 of the valve (FIG. 3D) in order to compensate for the variation in the glass level in the crucible 10.

The pour is stopped by closing the valve slide 32. A glass plug is then formed instantaneously in contact with the cooled slide 32. The installation then returns to the initial state illustrated in FIG. 3A.

The drawing off device conform with the invention is therefore capable of precisely controlling the pour start time and flux rate.

Furthermore, since the bar 36 forming the thermal bridge is entirely inside the crucible 10 and is made of stainless steel, it is not subject to any oxidation. Therefore, its life is the same as the life of the crucible.

Furthermore, the use of a local thermal bridge prevents any glass retention in the crucible 10 when the crucible is fully emptied.

Furthermore, and essentially, the combination of the thermal bridge formed by the bar 36 with the elongated shape applied to the pour orifice 30 is a means of melting the glass plug that blocks off the orifice entirely from one end of the orifice to the other end when the valve is open. Thus, no solid glass could fall in the container and cause splashes.

Finally, the special shapes applied to the ends 30a, 32a facing the pour orifice 30 and the slide 32 of the valve centre and stabilise the melting glass jet when drawing off, which is a big advantage.

The above description applies to drawing off glass containing very high activity nuclear waste. However, the drawing off process and device according to the invention are applicable to emptying any type of molten material contained in a cooled crucible.

What is claimed is:

1. Drawing off process of a molten material contained in a crucible with an at least partly cooled bottom, to form a solidified layer of material at the contact with the said bottom; process according to which drawing off is achieved by opening a valve, also cooled, initially closing off a pour orifice formed in the bottom of the crucible, in which the shape of the pour orifice as seen from above is elongated, and that drawing off is started at a first end of the said orifice forming a thermal bridge between a part of the bottom delimiting the said first end and the molten material contained in the crucible above the said solidified layer.

2. Process according to claim 1, in which the thermal bridge is formed by placing a bar made of a heat conducting material in a crucible in contact with the bottom part of the crucible along the first end of the pour orifice.

3. Process according to claim 1, in which a valve is used comprising a cooled slide that slides under the pour orifice along a longitudinal axis of the pour orifice.

4. Process according to claim 3, in which drawing off is started at a position on the longitudinal axis of the pour orifice, making the first end of the pour orifice convex and the leading end of the cooled slide concave, and centred on the longitudinal axis.

5. Process according to claim 4, in which the first end of the pour orifice is approximately in the shape of a V.

6. Process according to claim 1, wherein the crucible is used with a bottom having a main part and a part surrounding the orifice, the part surrounding the orifice having a relatively thin thickness compared to the main part.

7. Process according to claim 1, in which the bottom of the crucible used does not have any cooling means in the immediate vicinity of the pour orifice.

8. Device for drawing off a molten material contained in a crucible comprising a bottom and means of at least partly cooling this crucible to form a solidified layer of the material in contact with the bottom, device comprising a valve, means of cooling this valve and a pour orifice formed in the bottom of the crucible and normally closed by the valve, characterised in that the shape of the pour orifice as seen from above is elongated and in that means forming a thermal bridge are inserted between a part of the bottom delimiting a first end of the pour orifice and the molten material contained in the crucible above the said stratified layer.

9. Device according to claim 8, in which the means forming a thermal bridge comprise a bar made of a heat conducting material installed in the crucible in contact with the said part of the bottom along the said first end of the pour orifice.

10. Device according to claim 8, in which the valve comprises a cooled slide capable of sliding under the pour orifice along a longitudinal axis of the orifice.

11. Device according to claim 10, in which the shape of the first end of the pour orifice is concave and the shape of the leading end of the cooled slide is convex, centred on the said longitudinal axis.

12. Device according to claim 11, in which the first end of the pour orifice is approximately V-shaped.

13. Device according to claim 8, wherein the bottom of the crucible comprises a main part and a part surrounding the orifice having a relatively thin thickness compared to the main part.

14. Device according to claim 8, in which the bottom does not have any cooling means in the immediate vicinity of the outlet orifice.

* * * * *